Nov. 20, 1928.
A. BOSSELUT
1,692,542
ELECTRICAL MEANS FOR CONTROLLING LIFTS AND THE LIKE
Filed Jan. 19, 1926
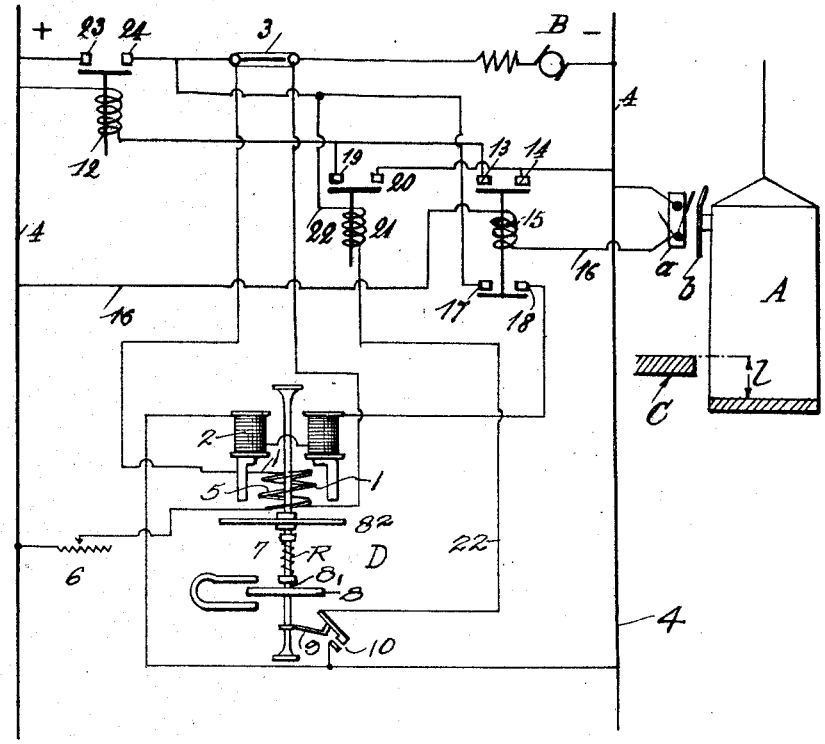
INVENTOR
Antoine Bosselut
BY Townsend & Decker
ATTORNEYS.

Patented Nov. 20, 1928.

1,692,542

UNITED STATES PATENT OFFICE.

ANTOINE BOSSELUT, OF PARIS, FRANCE.

ELECTRICAL MEANS FOR CONTROLLING LIFTS AND THE LIKE.

Application filed January 19, 1926, Serial No. 82,274, and in France December 3, 1925.

It is known that one of the problems met with in lifts and the like is that of stopping the cage at a landing with precision.

This is the case especially for lifts in which the arrest is caused by breaking the feed circuit of the driving motor, and the circuit bringing the cage brake into action; this breaking of the circuit usually takes place at a constant distance from a landing.

This has in general the effect with the same ascent speed of the cage to produce difference of level between the floor of the cage and the landing which will vary in accordance with the load. If it were possible at each journey to break the circuit at a point which varies as a function of the load on the cage it will easily be seen that there would cease to be any substantial difference in level between the floor of the cage and a landing.

This invention has for its object to solve this latter problem.

According to this invention the point where the circuit is broken for the arrest of the cage is automatically varied with respect to a landing as a function of the load in the cage by the aid of a wattage relay or other similar apparatus which causes a movable member to be given an angular displacement strictly proportional to the energy absorbed by the drive of the cage in normal action.

For example, the time required for said movable member to return to zero (a period which is also proportional to the energy absorbed and therefore to the load on the cage) may be utilized to break the hoisting motor circuit for the cage at the required moment with respect to a landing depending on the speed of the lift, while the ordinary floor contact of the cage is always broken in the usual manner when the cage is at a constant distance (suitably predetermined once for all) from the said landing.

The cage will thus always attain its precise level at the landing whatever the load thereon.

As will be seen this arrangement is entirely electrical and is very sensitive.

The invention is illustrated diagrammatically in the accompanying drawing in which:

The figure illustrates diagrammatically one complete cage controlling system of the push-button type showing my invention applied thereto.

A is a cage of any known type; B its electric motor; C the landing at which the cage stops. $a$ is the corresponding landing contact, actuated in known manner by the movement of the cage through a cam $b$ on the cage.

In carrying out my invention I provide means responsive to the quantity of energy being consumed by the hoisting motor B for timing the opening of the hoisting motor circuit. This means comprises a wattage relay D for controlling the contact 10. The wattage relay D is of a known type and comprises the member 7 movable angularly about its axis and constructed as a part of a usual electric flow meter. In the embodiment shown this relay includes a rotatable shaft 8' bearing disks $8^2$ and 8, the rigid arm 9 projecting from the shaft 8' and so constructed that when the shaft 8' is in zero or neutral position the arm 9 opens the contact 10.

The turning moment upon the wattage relay D is produced by the action of the fields resulting first, from a series winding 1 placed as indicated at 3 on the main current feeding the motor B and from a parallel winding 2 connected as a shunt around the motor B and controlled by the relay 15.

A spring R resiliently opposes the rotative movement of the shaft 8' and the parts carried thereby with the result that the greater the power consumed by the motor B the greater the angular movement of the disk $8^2$ and shaft 8', the spring R serving to return the parts to their zero position. The damper disk 8 is braked by the magnet 11 so as to insure an absolutely constant speed while the shaft and elements carried thereby are being returned to zero.

A supplementary winding 5 superposed on the winding 1 and regulated by a rheostat 6 adds its effect to the winding 1 in order to render these effects always positive (i. e., in the same direction as the rotation of the disk $8^2$). The winding 5 is such that the rotation of the movable member 7 is positive for the most feeble load on the cage.

The energization of the winding 2 of the wattage relay D being connected to the contacts 17 and 18 the movable member 7 will start back to zero at the instant the circuit is broken by the relay 15 through the operation of a cam $b$ and switch $a$.

12 is the contact-relay of motor B; the energization circuit of this relay may pass:

1. Either through conductors 13—14 the circuit being established when a relay 15, placed under the control of the usual drive circuit 16—16 of the cage and comprising contact $a$, is energized. The energized relay 15 also closes contact 17—18 forming part of the circuit of winding 2 of the wattage relay D or, 2. Through contacts 19—20 (which duplicate the contacts 13—14) which are established when a relay 21 in parallel with the relay 15 is energized. Relay 21 is energized through the circuit 22—22 which comprises the contact 10.

The operation of the device will be readily understood from the above description. When the cage is moved upwardly, for example and the usual controls (not shown) have been actuated for stopping the cage at the floor C, the cage, as it approaches the landing C, will mechanically open the switch $a$, by means of cam $b$, thus de-energizing the relay 15 and opening one of the parallel circuits to the relay 12. De-energizing the relay 15 also opens contacts 17, 18 thus opening the circuit through the coil 2 and de-energizing the wattage relay. The rotatable elements of this relay then move toward zero at a uniform speed and in a time dependent upon the energy being consumed by the hoisting motor B, that is, if a large wattage is being consumed by the motor B then the disk $8^2$ will have been turned to an extreme angular position and a longer time will be required before the arm 9 opens the contact 10 in the zero position of the shaft $8^2$. If the motor B is operating under a light load the shaft $8^2$ will have been turned to a lesser degree and the arm 9 will open the contact 10 shortly after the relay 15 is de-energized. It is obvious that the motor B will be consuming a large amount of energy when the cage A is heavily loaded and is moving correspondingly slowly. It will thus be seen that the hoisting motor circuit is opened through the wattage relay D and control relay 12 a longer period after the opening of switch $a$ when the cage A is moving slowly with the heavy load than where it is moving more rapidly with the lighter load.

This system can be used on the continuous current as on the alternating current.

What I claim is:—

1. In an electrically controlled lift the combination with a cage, of a limit switch associated with the cage, a second switch whose operation effects the arrest of the cage and means associated with the limit switch for operating the said second switch after a lag proportional to the load on the cage.

2. In an electrically operated lift the combination with a cage, of a limit switch associated with the cage, a second switch in the motor circuit and means associated with the limit switch for operating the second said switch after a lag proportional to the load on the cage.

3. In an electrically controlled lift, the combination with a cage, of a limit switch associated with the cage, a movable member, means associated with the limit switch for giving said member an angular displacement proportional to the energy absorbed for driving the cage in normal action and means whereby the return of the said movable member to its initial position effects the arrest of the cage.

4. In an electrically controlled lift the combination with a cage, an electric motor driving the cage, a limit switch associated with the cage, a wattage relay associated with said motor and with said switch, a movable member displaced when said relay is energized and means for breaking the circuit of the said motor on the return of said member to its initial position.

5. In an electrically controlled lift the combination with a cage, an electric motor driving the cage, a limit switch associated with the cage, a wattage relay associated with said motor and with said switch, adjustable means to take into account the usual balance of the lift, a movable member displaced when said relay is energized and means for breaking the circuit of the said motor on the return of said member to its initial position.

6. In an electrically controlled lift, the combination with a cage, an electric motor driving the cage, a limit switch associated with the cage, a wattage relay associated with said motor and with said switch, a winding connected to said relay, a rheostat for adjusting said winding a movable member displaced when said relay is energized and means for effecting the arrest of the cage on the return of said member to its initial position.

7. In an electrically controlled lift the combination with a cage, a limit switch associated with the cage, a movable member, means for giving an angular displacement thereto in proportion to the energy absorbed on driving the cage and means whereby said member ceases to be driven and is allowed to return on the opening of the limit switch and means for breaking an electric circuit on the return of the movable member to its initial position.

In testimony that I claim the foregoing as my invention, I have signed my name this 31st day of December, 1925.

ANTOINE BOSSELUT.